(12) United States Patent
Weiler et al.

(10) Patent No.: US 11,731,840 B2
(45) Date of Patent: Aug. 22, 2023

(54) TRUCK DETECTION SENSOR FOR MATERIAL TRANSFER VEHICLES

(71) Applicant: WEILER, INC., Knoxville, IA (US)

(72) Inventors: Patrick Weiler, Pella, IA (US); William Hood, Reasnor, IA (US); Brett Huizer, Knoxville, IA (US); Mike Weldon, Knoxville, IA (US)

(73) Assignee: Weiler, Inc., Knoxville, IA (US)

( * ) Notice: Subject to any disclaimer, the term of this patent is extended or adjusted under 35 U.S.C. 154(b) by 45 days.

(21) Appl. No.: 17/366,362

(22) Filed: Jul. 2, 2021

(65) Prior Publication Data

US 2021/0339962 A1 Nov. 4, 2021

Related U.S. Application Data

(63) Continuation-in-part of application No. 16/169,349, filed on Oct. 24, 2018, now Pat. No. 11,052,807.

(51) Int. Cl.
| | |
|---|---|
| *B65G 43/08* | (2006.01) |
| *B65G 67/04* | (2006.01) |
| *B65G 67/24* | (2006.01) |
| *G01G 19/414* | (2006.01) |
| *E01C 19/48* | (2006.01) |
| *B65G 47/20* | (2006.01) |

(52) U.S. Cl.
CPC ............. *B65G 43/08* (2013.01); *B65G 47/20* (2013.01); *B65G 67/04* (2013.01); *B65G 67/24* (2013.01); *E01C 19/48* (2013.01); *G01G 19/414* (2013.01); *B65G 2811/095* (2013.01); *B65G 2814/0302* (2013.01)

(58) Field of Classification Search
None
See application file for complete search history.

(56) References Cited

U.S. PATENT DOCUMENTS

| | | | | |
|---|---|---|---|---|
| 4,823,366 A | * | 4/1989 | Williams | ............... E01C 19/48 377/16 |
| 5,015,120 A | * | 5/1991 | Brock | ....................... B60P 1/38 414/528 |
| 5,452,966 A | * | 9/1995 | Swisher, Jr. | ............ E01C 23/04 404/108 |
| 7,484,911 B2 | * | 2/2009 | Frelich | ..................... E01C 19/48 404/108 |
| 8,282,312 B2 | * | 10/2012 | Braddy | ................. E01C 19/182 404/108 |
| 8,930,092 B2 | * | 1/2015 | Minich | ................... E01C 19/23 701/2 |
| 8,979,423 B2 | * | 3/2015 | Smieja | ..................... E01C 19/48 404/72 |
| 9,505,567 B2 | * | 11/2016 | Swearingen | ............ E01C 19/48 |
| 9,708,779 B2 | * | 7/2017 | Brown | .................... E01C 19/48 |
| 10,351,364 B2 | * | 7/2019 | Green | ................... B65G 69/00 |

(Continued)

*Primary Examiner* — Mark C Hageman
(74) *Attorney, Agent, or Firm* — Brownwinick Law Firm; David Breiner

(57) ABSTRACT

Disclosed is an example material transfer vehicle comprising a feeder having a hydraulic motor, a chain actuated by the hydraulic motor, and loading hopper configured to provide material to the chain; a sensor configured to detect a presence of a truck; and an electronic control module, wherein the electronic control module is configured to automatically increase a speed at which the chain is actuated when the sensor detects a presence of a truck.

10 Claims, 13 Drawing Sheets

(56) References Cited

U.S. PATENT DOCUMENTS

| | | | |
|---|---|---|---|
| 10,704,208 B1* | 7/2020 | Prather | E01C 19/48 |
| 10,907,310 B2* | 2/2021 | Tkachenko | E01C 19/20 |
| 2018/0022559 A1* | 1/2018 | Knutson | A01D 41/1217 |
| | | | 340/942 |
| 2018/0142427 A1* | 5/2018 | Tkachenko | E01C 19/004 |

* cited by examiner

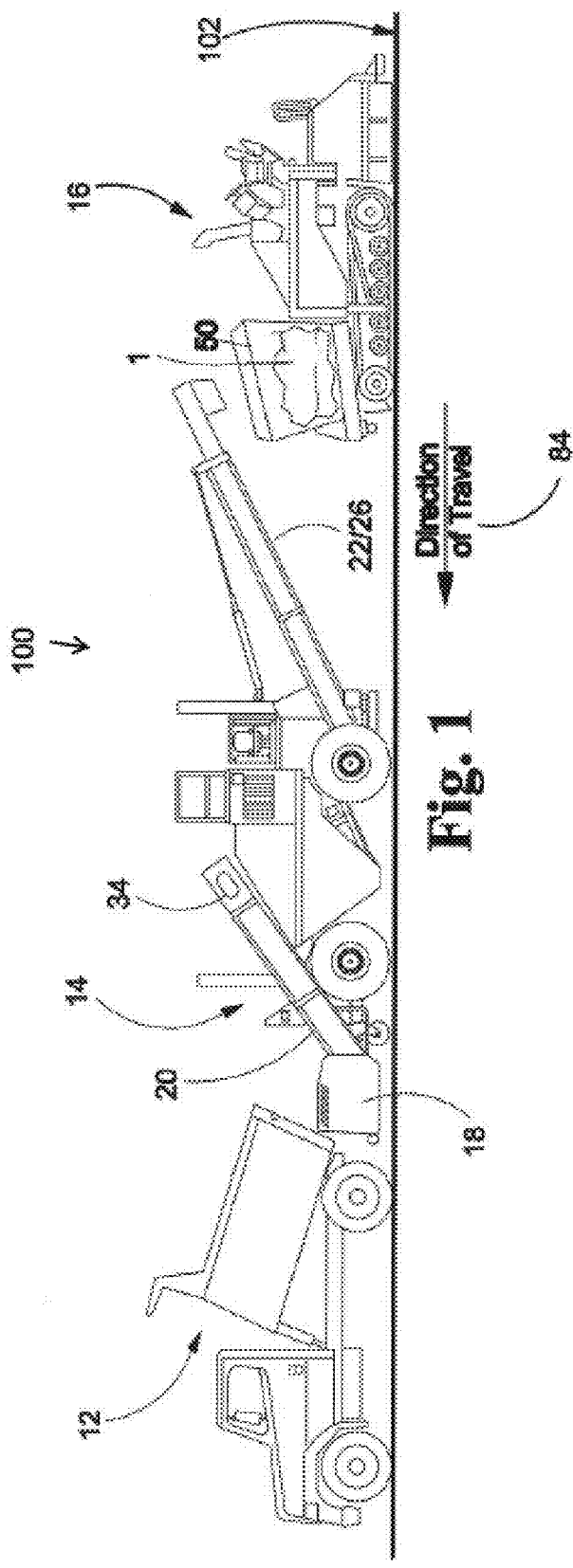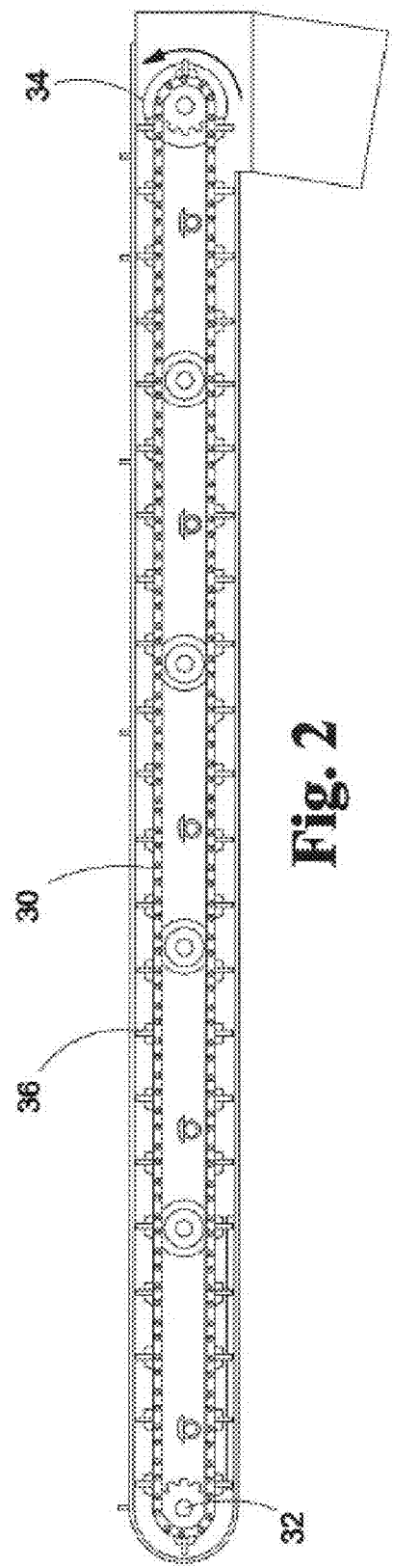

TRUCK DETECTION SENSOR FOR MATERIAL TRANSFER VEHICLES

CROSS REFERENCE TO RELATED APPLICATIONS

This application is a continuation in part of U.S. patent application Ser. No. 16/169,349 which was filed on Oct. 24, 2018, the entirety of which is hereby fully incorporated by reference.

BACKGROUND

1. Field

This disclosure relates to improving efficiency of a paving operation in terms of both labor and time. A variety of equipment and materials are needed in order to pave a road. In today's world, paving a road is often accomplished by a combination of machines working in a coordinated, cooperative manner without stopping. The act of paving requires, generally but without limitation, timely application of paving material to a prepared road bed. Paving is a process and requires an adequate and consistent supply of paving material at a temperature and consistency favorable for creating a smooth, continuous road bed. Further, the paving process requires means to lay or apply the paving material on the prepared roadbed in such a way that the resulting road surface is generally uniform. Applying or laying the paving material in a consistent manner creates a smooth and uniform road. The present invention relates to systems, assemblies, and methods for applying a material to a road surface.

2. Description of the Related Art

Before road construction begins, the road is carefully designed. The final design is influenced by factors such as the expected traffic volume, and the soil properties and topography of the area where the road will be constructed. Further, the road design needs to account for pre-existing or planned utility lines, drainage, and sewers. Finally, the climate may affect the road's design and the materials used in the road as may the current and expected density of population expected to use the road and the purpose it will serve (for example, whether the road's use is expected to serve mostly residential or mostly commercial needs).

Once a design is created, the real work begins. The area on which the road will be laid is cleared. Thereafter, a combination of excavation and bulldozing is used to shape and mount dirt across the road. Then the road is graded to smooth and level the surface. Next a base of soil, concrete and limestone is applied for stability. Finally, asphalt is poured and laid. Sometimes several layers of material are laid to form the road to obtain adequate stability and longevity.

Asphalt is typically laid using a paver. A paver includes means to move forward along the roadbed as the asphalt is laid and is run by an operator. It includes a hopper into which asphalt is filled, typically by a truck driven by a second operator. The truck brings the asphalt to the hopper on a just-in-time basis. Coordinating the delivery of the asphalt has long been a challenge to the efficiency of the road construction process and the resulting road quality.

Conveyors on or associated with the paver move the asphalt material through the paver from the front of the paver (relative to the direction of travel) to the rear where screw conveyors move the material onto the road bed. Thereafter, a screed smooths the surface. If the paver stops moving during application of the asphalt to the road bed or does not move at a relatively uniform speed, lateral joints in the pavement or other imperfections in the road surface occur reducing the smoothness of the road. High compaction screeds may be employed as means to increase the likelihood of obtaining a smooth surface. Typically, rollers follow behind the paver. If the asphalt is applied to the road bed in a consistent manner and compaction by the screed is done well, fewer passes of the rollers are required to achieve the specified final degree of compaction. This general description addresses the general operation of most pavers, however, differences may be present from model to model. For example, certain tools may be used to determine if the road bed is adequately smoothed, or to determine if the hopper is nearly empty, etc. Those differences are intended to be included by this description.

The asphalt in the paver's hopper will, of course, eventually run out. And, if the paver is moving at relatively high speeds such that asphalt is used at a rapid rate, a paver can create a hurry-up-and-wait paving sequence if the paver runs out of asphalt before the next truck arrives. Alternatively, arrival of the next load of asphalt before the paver needs it causes inefficiencies in time. Further, if the truck in which the asphalt is being transported does not include means to maintain the temperature of the asphalt, the asphalt may cool while the truck awaits transfer of its contents to the paver (or to a material transfer vehicle, MTV, to be described more fully below) resulting in a poorer quality road bed. When this happens, the smoothness and quality of the road surface suffers, not to mention the efficiency of the paving operation.

Establishing a continuous paving process, without stops, starts, and breaks in process for filling the paver's hopper will deliver a smoother road. Accomplishing these objectives requires a great deal of planning and coordination between plant production, trucking needs and the paving train's speed. Sometimes it is difficult to continuously lay material with a paver alone, as truck exchanges are slow and hopper capacity is limited. Therefore, material transfer vehicles (MTVs) (see FIG. 1) have been devised as means to deliver the additional surge capacity needed to help contractors better establish a continuous paving process to produce a higher quality, smoother mat and provide non-contact paving.

The first MTVs were developed in the late 1980s, which corresponded with a change in mix designs to a larger aggregate. Large aggregate mixtures were used at the turn of the century but were the subject of U.S. Pat. No. 727,505 granted to the Warren Brothers. The Court's decision in a lawsuit in Kansas in 1909 suggested that mixes with smaller maximum aggregate size did not infringe on the patent, so producers went to smaller aggregates to avoid infringement. Thereafter, producers became comfortable with the smaller aggregates and continued their use. However, as traffic volume and wheel loads increased, the smaller aggregate did not adequately withstand the punishment. Larger size aggregate mixtures had a resurgence in the late 1980s, mostly as heavy-duty type mixes. The change to a larger aggregate increased the occurrences of segregation, especially between truck exchanges, thereby reducing the quality of the roadbeds.

MTVs were initially created solely for the purpose of continuous paving. Early versions of MTVs featured large storage bins to allow extra paving time in between truck exchanges. These MTV designs did not feature reblending capabilities and the asphalt in the hopper cooled at varying rates depending on its position relative to the outer wall of the hopper and the amount of asphalt in the hopper. These inconsistencies in temperature resulted in inconsistency in road texture/smoothness.

In the mid 1990's some manufacturers began equipping MTVs with some type of reblending system on the basis that thermal segregation can be just as detrimental to the life of the road as other anomalies and non-uniform character. MTV's with large storage capacities and reblending capabilities gave contractors the necessary material surge to pave continuously at higher speeds, allowing more tons to be laid in a shorter amount of time without interruption. Specifically, the use of the MTV allowed for better timing and more consistent temperature of the material used to make the road bed. Generally, an MTV includes a loading hopper into which paving material is unloaded, a first transfer mechanism to move the paving material to its larger storage hopper, and a second transfer mechanism to allow transfer of material out of the larger storage hopper and over to the paver. These transfer mechanisms often take the form of conveyors.

In some prior art MTV embodiments as described (and as shown in FIG. 1), a middle feeder may be employed in the storage hopper to move material up and out of the storage hopper to the second feeder. However, there are other ways to convey the material in the storage hopper to the second feeder which may include, for example, equipping the storage hopper with a closeable opening in the bottom which may be selectively opened to allow material to flow out via gravity and onto the second feeder. Alternatively, the middle feeder may include any one or more of a belt conveyor or an elevator with paddles or other means known in the art to convey particulate matter thereby transferring the material in the hopper to the second feeder to be delivered thereafter to the paver. Other mechanical arrangements may likewise be employed to remove material from storage hopper.

The first feeder of an MTV typically includes an auger system to mix the asphalt and feed the asphalt to the second feeder via the storage hopper. The second feeder, is, in turn, configured to move the asphalt from the storage hopper on the MTV and deliver it to the paver hopper on the paver.

In a typical the paving train 100 as shown by FIG. 1, the first feeder 20 on the MTV 14 and the second feeder may be of like configuration or of alternative configurations known in the art for conveying particulate matter.

If stoppage or slow down occurs in the paving process due, for example, to running short on paving material before the next load arrives, the quality of the resulting road mat suffers; if material cools before it is applied, the desired uniformity of application may not be achievable. If the speed of the paving train's movement is not, generally, consistent speed the application may be uneven. Stoppages caused by the lack of availability of material before the next load is delivered are equally detrimental to the road mat. So, delivering the material either too soon or too late can result in a quality reduction of the road mat.

It is, also, important relative to the quality of the road mat to fully empty the hopper of material before the next truck arrives. If the hopper is not fully emptied, the material remaining cools. The new load of material arrives and is hotter; the cooled material will segregate resulting in poor quality road mat.

Many advancements relating to the use of pavers and MTV's have been accomplished. Advancements to the pavers and MTV's include employing automatic distance control of the MTV relative to the paver. Another improvement provides automatic speed control of the feeder conveyors that move the asphalt from the MTV to the paver to maintain a set level of material in the paver hopper. Yet another improvement comprises the use of lights to communicate with trucks bringing paving material to alert them when a new load of asphalt will be needed and when the dumping sequence is complete.

In conventional operation, the person unloading the paving material from the truck directly to the paving machine manually operates a switch for the dump hopper on the MTV after the truck has filled the dump hopper. To determine the appropriate time to initiate and the rate at which to dump the loading hopper, the operator considers the speed of the conveyor/augers used to remove material from the storage hopper as well as the amount of asphalt present in the storage hopper; the operator will make an educated guess as to when it is appropriate to dump/empty the loading hopper and at what rate it should be dumped to maximize the dump rate while preventing an overload of the MTV's feeder system. After all material has been emptied/removed from the loading hopper, the operator will then lower the loading hopper which can then accept another load of asphalt from the next truck. (FIG. 8 provides a flow chart illustrating the decision points in the process.) A sequence of events such as the one just described may be considered a "dump routine".

Damage to the machine may occur if an automated dump routine of the dump hopper (a.k.a. loading hopper) on the MTV is employed without consideration of proper measures. The current state of the art does not provide means for automating the start or stop of a dump routine related to emptying the dump hopper, nor does it disclose or describe means to monitor several factors that may indicate the machine is encountering problems relative to the dump routine. Providing an automated means to start or stop the dump routine would be advantageous relative to timing and efficiency, as well as to avoid damaging or interrupting the laying of the road mat. Monitoring certain factors would provide indicators of problems that may suggest that the routine should be shut down, or indicate a preferred rate of unloading material, or require a more optimal position of the dump hopper in order to accommodate changes in status of the indicators.

In prior art systems, a human operator is required to be present to track the several factors that may indicate dump routine problems. Further, as previously mentioned, one person is required to drive and load the paver with material and a second person to dump the trucks into the transfer vehicle. A human is required to dump material from the truck into a loading hopper to be conveyed to a hopper on the transfer vehicle. It is also the dump operator's job to determine when to start the dump routine based on the occurrence of several conditions, and when to stop or slow down the dump routine before damage occurs or at least before it becomes both extensive and expensive. The effectiveness of these activities in the prior art is almost entirely dependent on human judgment.

A paving train 100 shown in some detail at FIG. 1 is known and is used for applying asphalt to a road to construct a road mat 102. As shown in FIG. 1, the paving train 100 usually includes a dump truck 12, a material transfer vehicle (MTV) 14 shown in detail at FIG. 4), and a paver 16 (together, the paving train 100). The MTV 14 comprises a storage hopper 24 and a loading hopper 18. The MTV 14 usually also includes a first feeder (a.k.a. hopper conveyor) 20 and a second feeder 22. Sometimes an additional feeder is positioned in the storage hopper 24 to move material 1 in the hopper 24 to the second feeder 22. The paver 16 comprises its own hopper 50.

In some prior art embodiments as described, a middle feeder may be employed in the MTV storage hopper 24 to move material 1 in the MTV storage hopper 24 to the second feeder 22. However, there are other ways to convey the material 1 in the storage hopper 24 to the second feeder 22 which may include, for example, equipping the storage hopper 24 with a closeable opening in the bottom which may be selectively opened to allow material to flow out via gravity and onto the second feeder 22. Alternatively, the middle feeder may include any one or more of a belt conveyor or an elevator with paddles or other means known in the art to convey particulate matter. Other mechanical arrangements may likewise be employed to remove material 1 from storage hopper 24.

The first feeder 20 of the MTV 14 typically includes an auger system to mix the asphalt 1 and feed the asphalt 1 to the second feeder 22 via the storage hopper 24. The second feeder 22, is, in turn, configured to move the asphalt 1 from the storage hopper 24 on the MTV 24 and deliver it to the paver hopper 50 on the paver 16.

In alternate embodiments of the prior art, the storage hopper 24 is not present; in this case the first feeder 20 removes material 1 from the hopper 18 directly to the second feeder 22. Alternatively, the truck 12 may unload directly into first feeder 20 which, in turn unloads directly into paver 50.

In the paving train 100 as shown by FIGS. 1 and 2, the first feeder 20 on the MTV 14 may include a chain 30 driven by a sprocket and around idler 32. The chain is driven by a hydraulic motor 34. FIG. 2 is a cut-away, partial view of one embodiment comprising a chain 30 in the first feeder 20 equipped with paddles and/or slats 36 mounted on the chain 30 to transport material 1. The second feeder 22 may be of like configuration or of alternative configurations known in the art for conveying particulate matter.

If stoppage or slow down occurs in the paving process due, for example, to running short on paving material 1 before the next load arrives, the quality of the resulting road mat 102 suffers; and the desired uniformity of application may not be achievable. Temperature of the material and speed of the paving train both affect the quality and character of the roadmat. Stoppages caused by the lack of availability of material 1 before the next load is delivered are equally detrimental to the road mat. So, delivering the material 1 either too soon or too late, too hot, too cold, or unevenly can result in a quality reduction of the road mat 102.

It is, also, important relative to the quality of the road mat to fully empty the hopper 18 before the next truck 12 arrives. If the hopper 18 is not fully emptied, the material 1 remaining cools. When the new load of material 1 arrives it is hotter; the cooled material 1 segregates resulting in poor quality road mat 102. It is, therefore, important to fully empty the hopper 18 while the material 1 in the storage hopper 24 on the MTV 14 is being applied and while waiting for the arrival of the next truck 12 carrying material 1.

In prior art paving trains 100, an operator monitors the process and guesses or estimates when material 1 in the storage hopper 24 will need to be replenished by visually examining the level of material 1 in the storage hopper 24 or listening to engine speed which can be indicative of load. The operator considers this information, and makes an informed decision to predict when more material 1 will be needed, and then signals a driver of the truck 12 to bring the next load of material 1 so that, hopefully, it arrives before the storage hopper 24 is empty. But, it is critical in the prior art paving train arrangement 100 that the material 1 does not arrive so soon that the material 1 in the truck 12 measurably cools prior to its use so much that the quality of the road mat 102 is negatively affected. It is also important from the standpoint of efficiency to provide timely notification such that the driver's and operator's time will not be wasted and the number of trucks and drivers, and the time spent by drivers waiting and operators waiting to unload is minimized. The quality and costs of the road mat 102 being laid are negatively affected by these factors if they are not adequately managed.

Generally, in prior art arrangements, when the truck 12 arrives at the paving train 100, the driver unloads material 1 into the hopper 18 of the MTV, from which it is conveyed to the storage hopper 24 of the MTV and then used in accordance with the paver's 16 rate of movement and application.

Prior art methods do not include automated means to address the timing issues of the process for moving material 1 from truck 12 to the loading hopper 18 and from the hopper 18 to the storage hopper 24, relying instead mostly on driver and dump operator instinct and signaling. Further, a routine for emptying the loading hopper 18 to the storage hopper 24 before the next load arrives is implemented by a dump operator.

In order to fully empty the loading hopper 18, prior art methods require the dump operator to take into account several factors to decide when to initiate a dump routine and how fast to dump the hopper 18. The factors taken into consideration and the various actions taken by the operator in prior art arrangements for initiating and managing the emptying of the hopper 18 of the MTV 14 is illustrated by the decision tree shown at FIG. 8. As is known, the dump operator has to initiate movement of a chain 30 in a first feeder 20 to convey material from the loading hopper 18 to the storage hopper 24 and, further, determine when a dump routine to empty loading hopper 18 should be initiated; then, the dump operator is required to initiate the dump routine and, thereafter, determine when the dump routine is complete and should be reset. In addition to initiating and resetting, the operator also has to consider: whether the chain 36 is running and, if so, manually modulate dumping of the hopper 18 and monitor whether the chain 36 is running fast enough to move the material 1 out of the hopper 18 at a speed that will avoid stalling of the feeder system 20 yet accomplish the desired dump rate.

Measurable cooling or segregation of material 1 in the hopper 18 also has to be minimized which means a dump routine needs to be efficiently begun and run; once the material 1 is fully unloaded from the truck 12, the dump operator is required to initiate a dump routine for the purpose of removing material 1 from the loading hopper 18 to minimize or avoid material cooling and sticking to the hopper 24, or simply cooling and then causing quality issues in the next load of materials to be unloaded.

In an attempt to manage flow of materials, U.S. Pat. No. 9,505,567 to Roadtec, discloses means to control rate of material flow. But its arrangement does not include means to initiate or stop flow, or in any way manage the dump routine. The disclosed apparatus covers means to control the rate of introducing material to the surge bin. The disclosure describes employing sensors to monitor the physical level of asphalt and to control rate of delivery of asphalt from the paver's hopper to the paver's distributing auger, but suggests no more than that. It does not address remaining problems in the art. Therefore, there was a need for apparatus, method, or system to improve efficiency, and reduce costs, by at least partially automating the process of emptying the loading hopper in a paving train.

SUMMARY

As previously described, a driver of the truck delivering material, and a dump operator are often both employed in the prior art in order to increase the rate at which the loads can be unloaded into a hopper of a material transfer device (MTV) which, in turn, is run by an MTV operator. The inventive arrangement avoids the need to stop or slow the paving train 100, in turn reducing the number of trucks 12 and drivers 4 necessary to efficiently feed the paving train 100. In the present invention a dump operator is no longer required to initiate the dump routine and, once emptied, to reset the hopper 18 while the driver 4 drives the truck 12 back to be refilled with material 1.

The former method of using a dump operator is inefficient. But, the truck's driver must remain in the truck and the MTV operator needs to remain where he can operate the MTV which means there must be a dump operator to initiate the dump routine. Still, the dump process transferring material from the truck to the MTV would be more advantageous and much more efficient if the requirement for a person to function as the dump operator could be eliminated altogether. Further, it would be advantageous if the hurry-up-and-wait, inefficient scenario of expensive prior art dump routines, employing truck driver, dump operator, and MTV operator could be avoided.

Therefore, there was a need for means to automate the sequence and timing related to loading and transporting material to the paving train for just in time delivery. Increasing the efficiency of the initiation and termination of a dump routine was needed in order to provide a more consistent road mat without the inconsistencies that occur when human judgment dictates when the dump routine should be initiated or terminated. Therefore, several aspects of the process have been automated over the last several years in an effort to increase efficiency. For example, controls exist that automate the distance between the MTV and the paver, or that automatically control speed and on/off status of the feeder conveyors to the paver. However, until the present invention, there had not yet been devised a way to automate the dump routine of the loading hopper of the MTV, thereby removing the possibility of error by human judgment and increasing the efficiency of this portion of the road paving process, eliminating the need for a dump operator thereby conserving both time and labor expenses. This disclosure contemplates several interrelated methods and the mechanics required to initiate and operate those methods all intended to provide more efficient processes for paving roads including eliminating the need for a dump operator altogether.

The present invention provides a system for continuously providing an optimally adequate paving material supply to a paving machine while increasing efficiency and minimizing road quality issues. The system of the present invention provides means and method to provide and maintain adequate paving material in the storage hopper of a material transfer vehicle (MTV) via monitoring, managing, and measuring various fill, timing and travel factors. The present invention specifically addresses automation of a dump routine pertaining to the loading and unloading of the dump hopper of the MTV. Managing this routine via automatic initiation relative to specific conditions, and completing the necessary sequence without or with only minimal human intervention provides an operational advantage and efficiency over the prior art and addresses a long felt need.

The present invention provides means to automatically initiate, execute, and terminate a dump routine without complicated signaling or processing; it, therefore, differs markedly from the prior art paving train arrangements offering advantages not previously available.

BRIEF DESCRIPTION OF THE DRAWINGS

Example embodiments are described in detail below with reference to the attached drawing figures, wherein:

FIG. 1 is a diagram showing the arrangement of the system including a paver, MTV, and truck unloading, i.e., the paving train;

FIG. 2 is a cut-away view of a chain and sprocket relationship of a first feeder;

DETAILED DESCRIPTION

Figure 3:
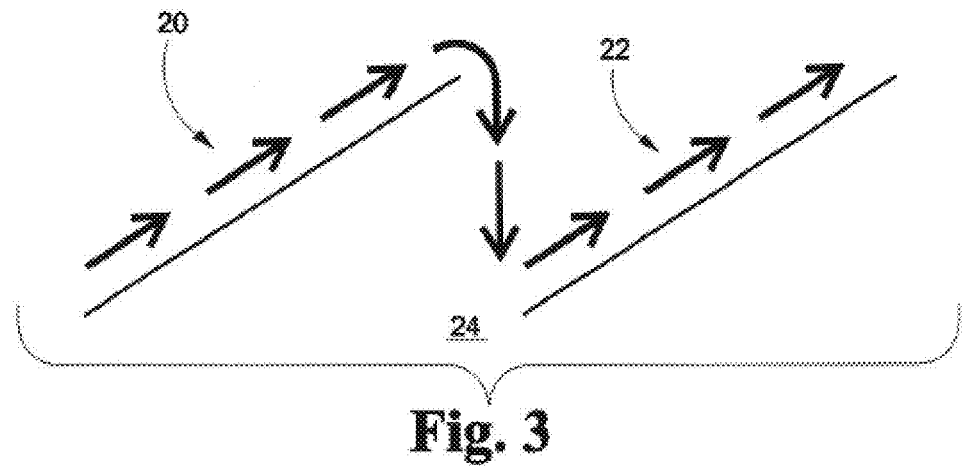
FIG. 3 is a diagram representing material flow through the MTV.

Example embodiments of the present invention will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to systems and methods of applying a material, for example, asphalt, to a surface and improvements thereto.

The present invention improves upon prior art paving train arrangements. Specifically, in the present invention, a dump operator can be eliminated. In a first embodiment, (See FIG. 1) when the truck 12 reaches the paving train 100 the driver 4 moves the truck 12 into position to unload into the loading hopper 18 of the MTV 14. The MTV 14 is operated by an MTV operator. The truck driver 4 or the MTV operator initiates the loading hopper conveyor 20 wherein such initiation may be manual or may be via remote activator which sends a signal to a controller 46 or other means capable of turning on the loading hopper conveyor 20. One of the truck driver 4 or MTV operator causes the truck box 12a to be raised or otherwise unloads the truck 12 into the loading hopper 18 (which may alternatively include driving the truck over the unloading hopper and opening a trap in a floor of the truck box 12a allowing material to flow into the unloading hopper). Once the truck 12 is unloaded, the driver 4, or MTV operator lowers the truck box 12a or otherwise causes the truck box to return to its pre-unloading status (which may include returning the box to its pre-unloading position). Then either the driver of the truck 4 or the MTV operator employs the remote activator to send a signal to one or more controllers 46 to initiate the dump routine to more fully empty hopper 18 and transfer material 1 to the storage hopper 24. In a preferred embodiment, the routine is automated and is terminated by deactivating the loading hopper conveyor 20. In an embodiment, a receiver receives a signal from remote activator and said one or more controller 46 initiates the loading hopper conveyor 20 upon receipt of the first signal/command from the driver's remote activator, initiates the hopper dump routine upon receipt of a second command from the driver's remote activator and stops the first feeder or hopper conveyor 20 upon receipt of the third command from the driver's remote activator. The signals sent may all be the same, each successive signal initiating the next action in a predetermined order. Alternatively, the remote activator may include three different selectable buttons or signals, and the controller 46 associated with the receiver may be programmed to receive and process each of one or more, for example, three possible commands thereby allowing the driver 4 or MTV operator to optionally select stop and/or restart of the loading hopper conveyor 20 and/or initiate the dump routine at will. Alternatively, in a third embodiment, an electronic sensor or "eye" may be employed to detect the truck's 12 presence when it nears the loading hopper conveyor 20 and wherein upon receipt of a signal indicating the truck's presence, the controller 46 automatically initiates the loading hopper conveyor/first feeder 20, thereafter the driver 4 or MTV operator can initiate truck 12 unloading. Upon completion of the unloading process, the truck driver 4 may simply drive away; the electronic sensor or eye then detects the truck's 12 absence and signals the controller 46 which then initiates the dump routine to transfer the remainder of material 1 in the loading hopper 18 to storage hopper 24 and then automatically terminates the operation of the loading hopper conveyor 20 upon detection of a predetermined value related to RPMs, Pressure, or occurrence of a pre-set time lapse.

In one embodiment of the inventive paving train 100, signals related to the full or empty status of the storage hopper 24 may be received by the controller 46. The controller 46 may, in response, compare the signal to known or expected values, thereafter adjusting the speed of the feeder 20, 22 or other mechanism to control the rate of unloading the storage hopper 24. Alternatively, the controller 46 may compare the signal to a known or expected value to determine when/if a truck 12 should be loaded and/or begin travel toward the MTV 14 in order to avoid stoppage. These values may be processed by the controller 46, taking geographic positions of the next truck 12 and the storage hopper 24 into account and an expected time to load and speed of travel to determine when to initiate travel of a material-filled truck 12 toward the paving train 1 to provide just-in-time delivery of material 1 to the loading hopper 18, said controller 46 accordingly sending a signal to initiate loading of the next truck 12 and subsequent travel.

In an alternative embodiment, the electronic controller 46 of the present invention may simply detects the presence or absence of a condition 302 related to the changing amount of paving material 1 in any one or more of the MTV storage hopper 24, the paver's hopper 50, or the loading hopper 18 (e.g., above or below a certain vertical level of material remaining, or its weight, or the status (e.g., on/off) of the feeder 22 or of hopper conveyor 20. Upon detection of the change in condition 302, the controller 46 may generate a signal 304 to cause initiation of travel of a truck 12 toward the paving train 100 to deliver additional material 1. Upon detection of changes in other conditions 302, the controller 46 may generate a signal 306 or may otherwise directly initiate the dump routine to clear material 1 from the MTV's loading hopper 18 in accordance with one of the previously discussed embodiments.

Figure 5:
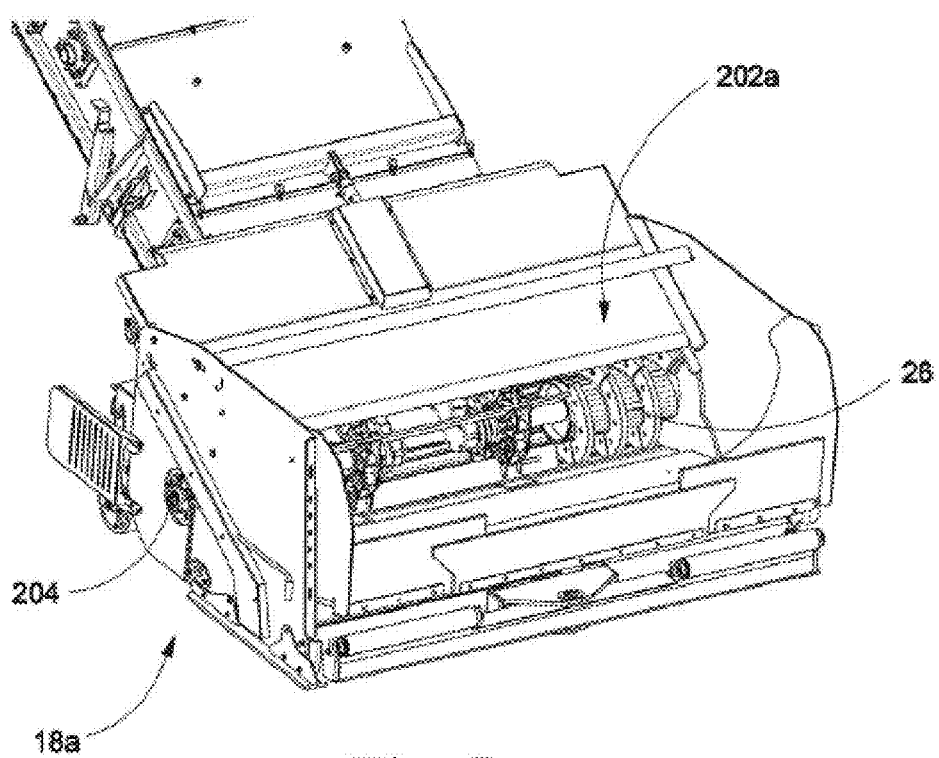
FIG. 5 shows the MTV loading hopper down with flow-control baffle in an open first position ready to receive material from a truck.
Figure 6:
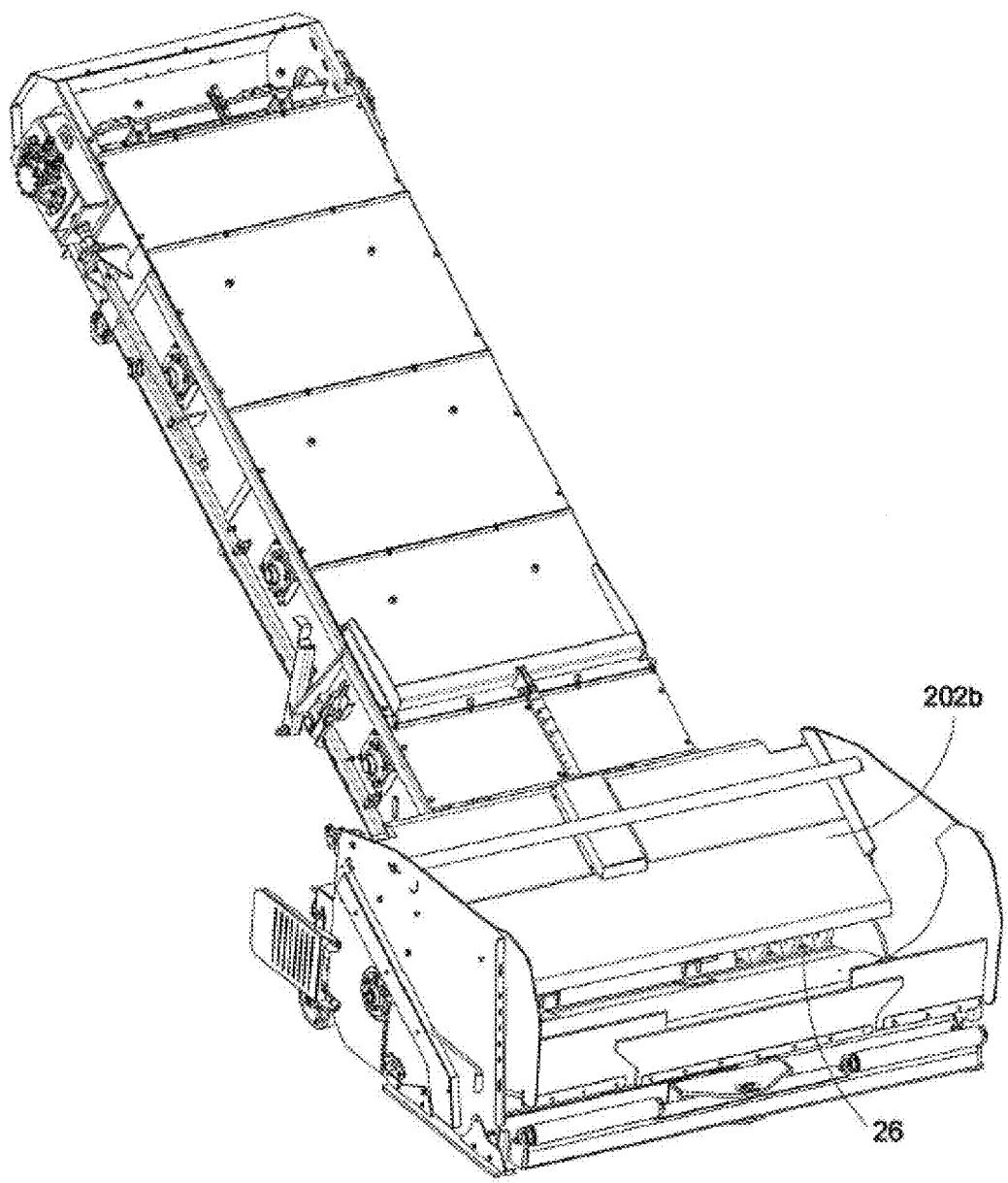
FIG. 6 shows the MTV loading hopper and flow control baffle in a fully closed position to allow flow control.
Figure 7:
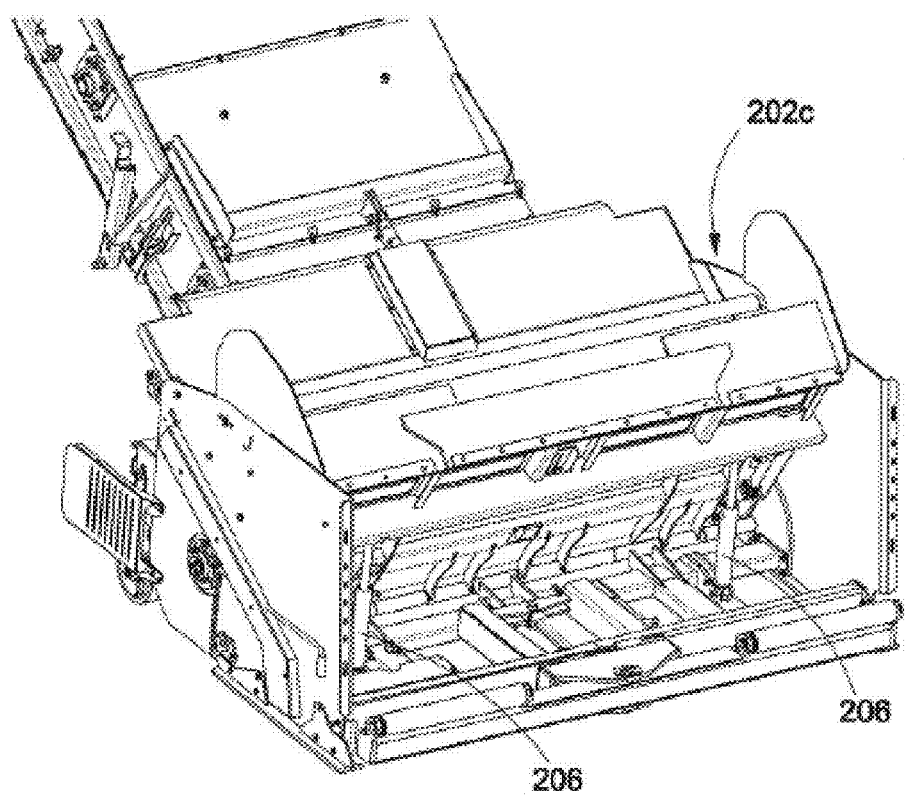
FIG. 7 shows the MTV loader hopper closed and raised to facilitate flow of material into augers.
Figure 8A:
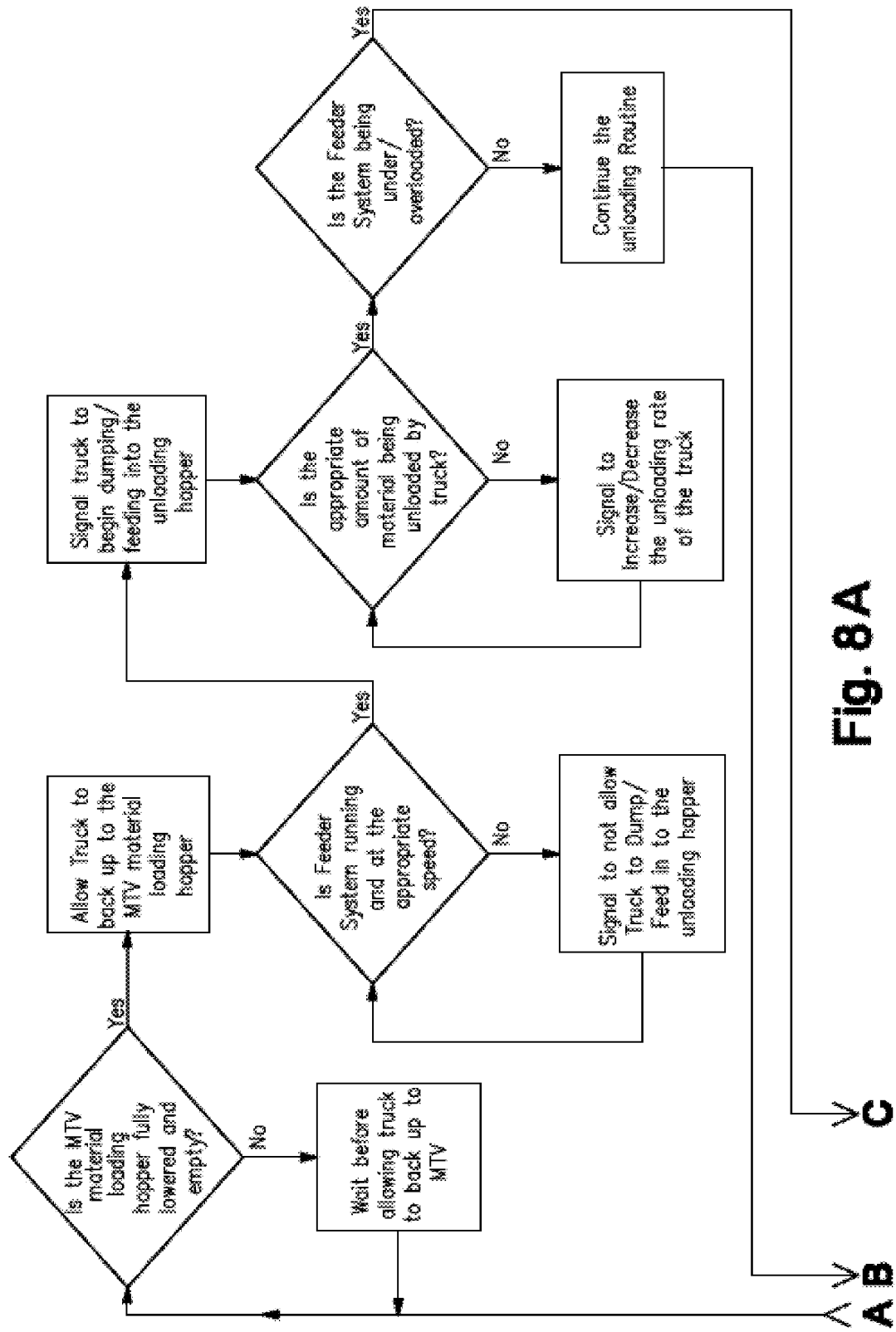
FIG. 8A comprises a flow chart illustrating an auto-dump routine.
Figure 8B:
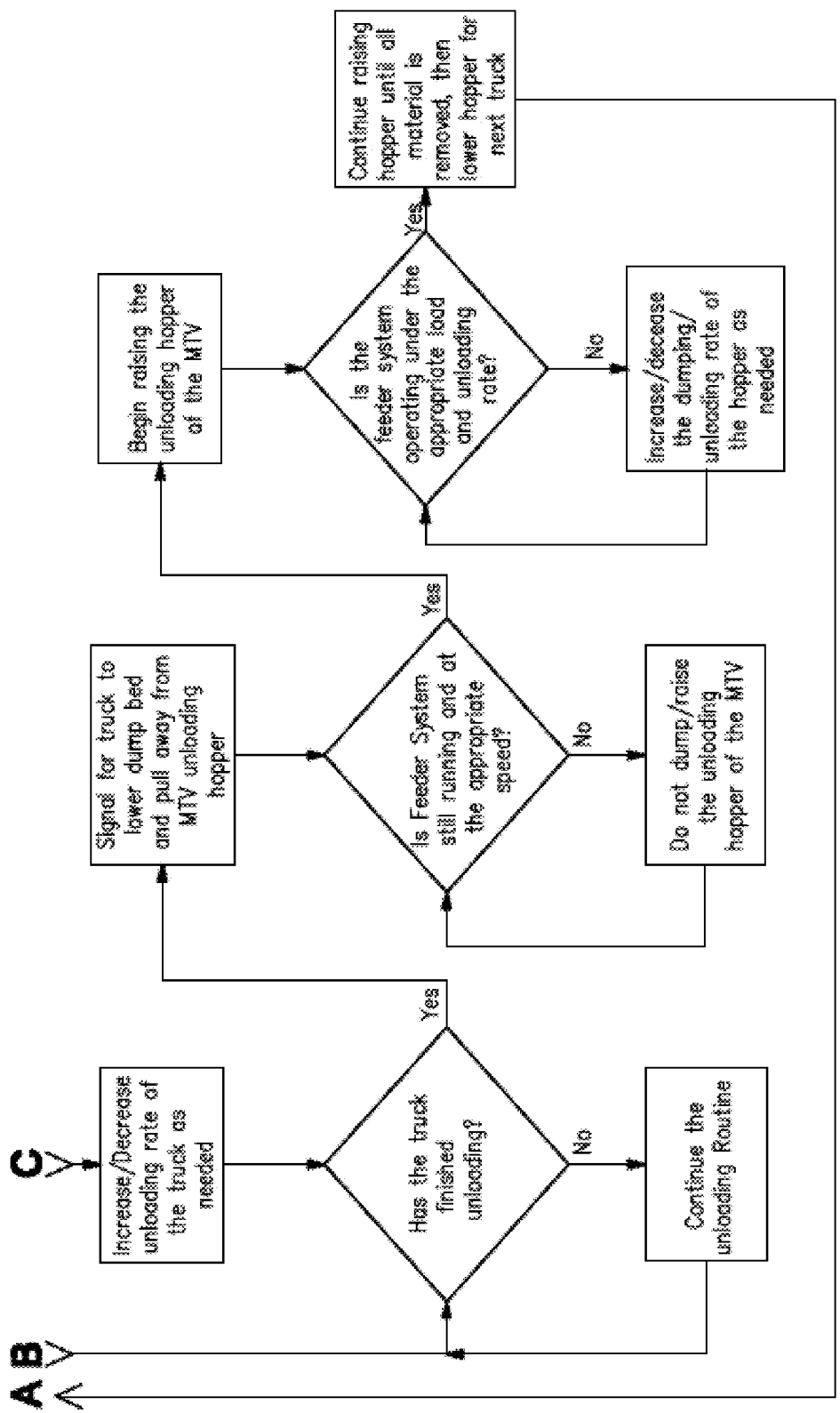
FIG. 8B is a continuation of FIG. 8A which is a flow chart illustrating an auto-dump routine.

Referring now to FIGS. 5-7, the loading hopper 18 of the material transfer vehicle (MTV) 14 of the present invention may be improved to optionally include a moveable flow control baffle to provide improved means to dump material 1 from the improved loading hopper. Further the improved loading hopper is associated with a material conveying system 204 comprising a power source which may be the motor 34 associated with the material conveying system 204 (in ways that would be understood by one of ordinary skill in the art), and means to tip or tilt 206 the loading hopper 18 while changing the position of the flow control baffle thereby adjusting the material flow into the first feeder 20 of the MTV 14. Preferably, the MTV 14 is equipped with an onboard computer which may be the ECM 46 or other similar means for initiating (and, in some embodiments controlling) an unloading sequence or dump routine to manage dumping the hopper 18. The unloading sequence or dump routine is illustrated in detail by FIG. 8.

Prior to initiating the unloading sequence, the loading hopper 18, the flow control baffle, and the means to tip or tilt the loading hopper 206 each exist in an initial condition or first status 18*a*, and 202*a* respectively. The unloading sequence may be initiated by an operator or may be initiated by a toggle or "condition" signal that indicates the vehicle 12 that was unloading material into the hopper 18 is no longer unloading or has moved out of an unloading position. The toggle signal may be generated by something as simple as an electronic eye monitoring the flow of material or the presence of the truck or may, alternatively, be determined by employing sensors pertaining to detected flow rate that detect when new material 1 is no longer being unloaded/added to the hopper 18 or, alternatively, may be the result of an action of the operator.

Once the truck 12 finishes unloading into the hopper 18 as determined by receipt of a second signal, (which may be determined by the ECM 46 by monitoring system pressure of the motors on the conveyor circuit, employing a sensing eye, or monitoring or detecting pressure in the dump hopper lifting circuit and comparing to pre-determined value ranges or by detecting a Boolean indicator such as on/off, running/stopped) and thereafter the hopper 18 is "empty" or emptied enough the onboard computer or ECM 46 initiates the unloading sequence or routine to cause the hopper 18 to become more fully emptied. The routine comprises employing the motor 34 to cause power to be supplied via hydraulic pressure or other means so that means to tip 206 the unloading hopper 18 can tilt the hopper 18 for unloading. The routine or sequence positions the flow control baffles and the degree that the hopper 18 is tilted by using means to tip or tilt 206 relative to a detected material flow rate. In some embodiments, the routine causes the onboard computer or ECM 46 to monitor the material flow rate and adjust a first status of a source of power (which may comprise a motor) and flow control baffles 202*a* to a second status 205*b* and 202*b*, respectively, and the means to tip or tilt 206 from a first status to a second status or positions therebetween, relative to a desired range of material flow rate while the hopper 18 is being emptied. Flow rate may be determined by speed of the feeder system 20, 22 of the MTV 14 receiving material 1 from the hopper 18, or monitoring the pressure, load, amperage of the feeder system 20, 22 of the MTV 14 receiving material. Alternatively, rather than adjusting or managing the flow rate while the hopper clean out routine is conducted, flow may be considered in a flow or no-flow Boolean arrangement; if the sensor detects flow, the hopper 18 remains tilted and/or the dumping portion of the routine continues. Upon detecting no material flow, the onboard computer or ECM 46 applies the remaining unloading sequence/routine 210 to return the flow control baffles to their ready positions 202*a*, return the hopper 18 to its loading degree of tilt, and turn off or otherwise adjust the motor 205.

In another embodiment rather than detecting just the presence or absence of a condition, a sensor 42 or sensors may be configured to wirelessly transmit a signal or signals to the electronic controller 46. For example, if the storage hopper 24 of the material transfer vehicle 14 becomes full, the controller 46 may be configured to receive a signal from sensor 42 readings to indicate the present level of material 1, and, upon receiving signals that indicate the material 1 has reached a pre-set level in the hopper 24 the controller 46 may shut off the first feeder 20 to prevent further asphalt material 1 from being loaded into the storage hopper 24 of the material transfer vehicle 14. This kind of signal may, alternatively, or additionally, also be communicated over a wire installed on the equipment or via other known means.

Alternatively, other signals or indicators related to the full or empty status of the hopper 24 may be received by the controller 46. The controller 46 may, in response, compare the signal to known or expected values, thereafter adjusting the feeders 20, 22 or other mechanism to control the rate of loading or unloading the storage hopper 24 or, as described herein, signal the need to initiate travel of a material-filled truck 12 toward the paving train 100 to provide just-in-time delivery of material 1 to the hopper 18.

In either the sensor embodiment or the indicator condition embodiment, allowing the transport, refill or dump trucks 12 (See 12 at FIG. 1) to dump paving material 1 into the loading hopper 18 of the MTV 14 versus the traditional method of dumping the trucks 12 directly into the hopper 50 of the paver 16 provides a timing mechanism intended to address the issues otherwise expected with regard to road quality which will result from an inconsistent paving routine. Without the use of an MTV 14, ill-timed contact between the paver 16 and the transport truck 12 can cause defects in the road surface quality. Employing either of the assemblies and methods disclosed herein will provide automated aspects which will optimize the process with less operator involvement thereby increasing the efficiency of the paving process.

In some embodiments, the storage hopper 24 may be designed to maximize gravitational assistance comprising, e.g., sloped floors for unloading and/or may be equipped with mechanics such as an unloading feeder mechanism (herein also described as the middle feeder) to assist in the unloading of the material 1 from the storage hopper 24. Such mechanics may include chains across the floor of the storage hopper which are associated with a power take-off as is known in the art or other known means to rotate the chains across the floor and around a set of sprockets, thereby facilitating movement of the material 1 in the storage hopper 24 that is loaded on the chains to the feeder 22. Moveable shovels or slats along the floor of the hopper 24 may be alternatively employed as a feeder mechanism. The feeder 22 of embodiments of the present invention comprises an auger system 26 or other similar system designed to move particulate matter such as the material 1 to the hopper 50 on the paver 16. Mechanics in other embodiments may employ gravity by using cylinders to tip the storage hopper 24 upward or employ slidable doors in the floor 6 of the storage hopper as is known in the art. And there are still other means known in the art to be employed to assist unloading of heavy particulate material 1 that tends to clump, aggregate, or settle.

Additional Embodiments

The present invention may further comprise means to manage or monitor the level of material 1 in the storage hopper 24 wherein said means may be as simple as a level detector, which may be mechanical or electrical (as previously described), and/or incorporate a host of other factors to determine the amount of material in the hopper. This embodiment of the present invention further comprises means to actuate the mechanics to assist in the unloading of the material 1 from the storage hopper 24, as needed to manage the timing aspects necessary to maintain a constant supply of material 1 as needed by the paver 16 for a nonstop paving operation.

Specifically, in this embodiment, the means to monitor and maintain adequate asphalt 1 in the hopper 50 of the paving machine 16 or a storage hopper 24 of a material transfer device 14 further comprises the means to control 46 or controller 46. Said means to control 46 receives and compares measurements of at least one operational input selected from the group comprising chain speed, feeder system pressure, pressure in a hydraulic circuit for the motor that drives the conveyor chains or hoppers that employ chained mechanisms to assist in unloading the hopper or the speed/rate of another feeder system, loading hopper 18 position, geographic location and, if it comprises a loading hopper 18 that can be raised or raised on one end, its height or position relative to its highest possible position, motor speed (e.g., of motors 34 running augers 26 and/or conveyors 20, 22 as an indicator of drag), weight of asphalt material 1 in the MTV storage hopper 24, and/or dump cylinder pressure on the paving machine 16 and/or the MTV 14. Comparing these measurements to each other and/or to acceptable known ranges allows the means to control 46 to determine when the hopper 24 is nearing a pre-set level of material loaded and then adjust operational inputs to control the rate of application in order to conserve and manage material for consistent application.

In one embodiment, a pressure transducer is added to the loading hopper 18 on the MTV 14, a hydraulic valving circuit and that transducer are employed to monitor lifting pressure of the loading hopper 18 of the MTV 14. The pressure transducer sends one or more signals to said means to control 46. Means to control 46 may monitor the weight of material, dump cylinder pressure, pump output, chain speed, and/or circuit pressure. Means to control 46 may receive signals to allow it to measure the loading or unloading rate of the loading hopper 18 on the MTV, or to receive a signal to engage the unloading sequence of the hopper 18. An alternative means to control the unloading sequence may include monitoring the presence of a truck 12 unloading into the hopper 18 which may be accomplished via GPS locator systems or via simple motion detectors, or paired, near-distance signal emitter/receiver pairs or other means known in the art. Signals that indicate the speed of the system 20 that is receiving material from the hopper 18 may also be considered by said means to control 46; such signals may indicate pressure, load, amperage. Upon receiving measurements that said means to control 46 has been programmed to recognize as indicating the hopper 18 is empty or nearing empty, said means to control 46 causes adjustment of one or more operational inputs to control the rate of unloading the hopper 18 or 50 and to accommodate for any relative changes of any measurements of said at least one operational input.

Means to control 46 could really be any electronic device that is capable of receiving a signal, and outputting a signal based on controls logic/algorithms. Typically, the term micro-controller covers a wide range of systems all of which may be employed here. Said means to control 46 in the present invention adjusts at least one or more of the operational inputs to control the rate of unloading the storage hopper 24 for the purpose of maximizing efficiency and avoiding or minimizing dump routine problems.

Dump routine problems to be avoided may include stalling of the auger system 26 or damage to the feeder mechanism 20, 22 which includes augers, chains, conveyors, and/or belts. Means to control 46 may comprise a machine controller 46 for receiving signals regarding the aforementioned measurable operational inputs applying an algorithm to one or more of those signals, and calculating the correct time to send outputs/signals. These signals may comprise controller 46 generated or transmitted signals 48 (which differ from signals which are received by the controller, not generated by it) sent to a hydraulic valving circuit that controls the hopper 24 raising/lowering cylinders 37. Means to control 46 also monitors the detectors for any issues that may occur and may shut down the dump routine for out of range operations. In one embodiment, the valving requirement is met by a proportional valve. In this arrangement, said means to control 46 adjusts the dumping rate according to detected values compared with acceptable ranges.

The means to control 46 monitors (either continuously or periodically) some or all of the following: whether the chains 30, used to empty the hopper 24 or 50 are running, the speed with which they are running, the hydraulic pressure and/or amperage of the circuit that drives the system, the dump cylinder pressure, the motor speed of the auger/conveyors 26, 20, 22 and/or the translational speed 84 of the paving machine or paver 16 all as a means to determine and predict when and where the MTV storage hopper 24 or the paver hopper will reach empty. The means to control 46 compares each of the various measurements to an expected and/or normal range for the desired operation; determines the appropriate speed to efficiently empty the hopper 24 or 50; and predicts when the hopper 24 will be and/or is cleaned out. The means to control 46 monitors the motor speed and pressure/amperage of an auger circuit 82 employed to run the augers and/or conveyors 26, 20, 22; it measures dump cylinder pressure, geographic position of the MTV hopper 24, and presence, level, or amount of asphalt material 1 in the MTV hopper 24. Said means to control 46 compares these measurements with the speed of the hopper's translational movement 84, takes into account the distance between the MTV storage hopper 24 and a refill truck 12, along with the level of material 1 within the hopper of the paver and, employing the algorithm, calculates and predicts when and where the MTV storage hopper 24 will reach an empty status (or a "refill due" status). Said means to control 46 then dictates, based on the algorithm or a sub-portion of algorithm where the algorithm takes into account the expected speed of travel of the reloading vehicle or refill truck 12 and the distance between the MTV 14 or other vehicle that holds and transfers asphalt or paving material 1 or, if no MTV 14 is employed, the distance to the paving machine 16 along the paving route, and the estimated or known load time required to fill the refill truck 12, and the time by which the hopper 24 on the MTV 14 (or the hopper on the paving machine 16) should be fully loaded and determines a start time for when the refill truck 12 should begin loading, be fully loaded, and when it should begin travel toward the MTV 14 (or paving machine 16 when no MTV is present). Monitoring these factors facilitates prediction of a time to begin filling the MTV hopper 18 (or the paver's hopper) in order to finish just-in-time to continually provide material 1 to the storage hopper 24 of the MTV 14 and, thereafter, to the hopper of the paver 16. The predictive capabilities provide means to avoid, without slow down, cool down, or stoppage of laying the asphalt which, in turn, minimizes damage, and increases efficiency of unloading/loading routines while maintaining the desired quality of the road mat 102 and resulting road.

If the means to control 46 detects that the level of asphalt material 1 in the MTV hopper 24 (or hopper on the paving machine 16 when no MTV is employed) is below a preset level (or other volume indicator as previously discussed herein), it can signal the paving machine 16 to slow its rate of application. Slowing the application rate will prevent the MTV 14 hopper 24 (or paving machine 16 hopper when no MTV is employed) from running out of material 1 before the new material 1 is delivered to the MTV 14 (or to the hopper on the paving machine 16). Further, managing the rate prevents subsequent stoppage of the paving train 100 comprising the paving machine 16 and, optionally, the MTV 14. Slowing the rate and preventing stoppage avoids the decrease in the quality of the road mat 102 otherwise expected if the material 1 cannot be consistently laid.

Figure 9:
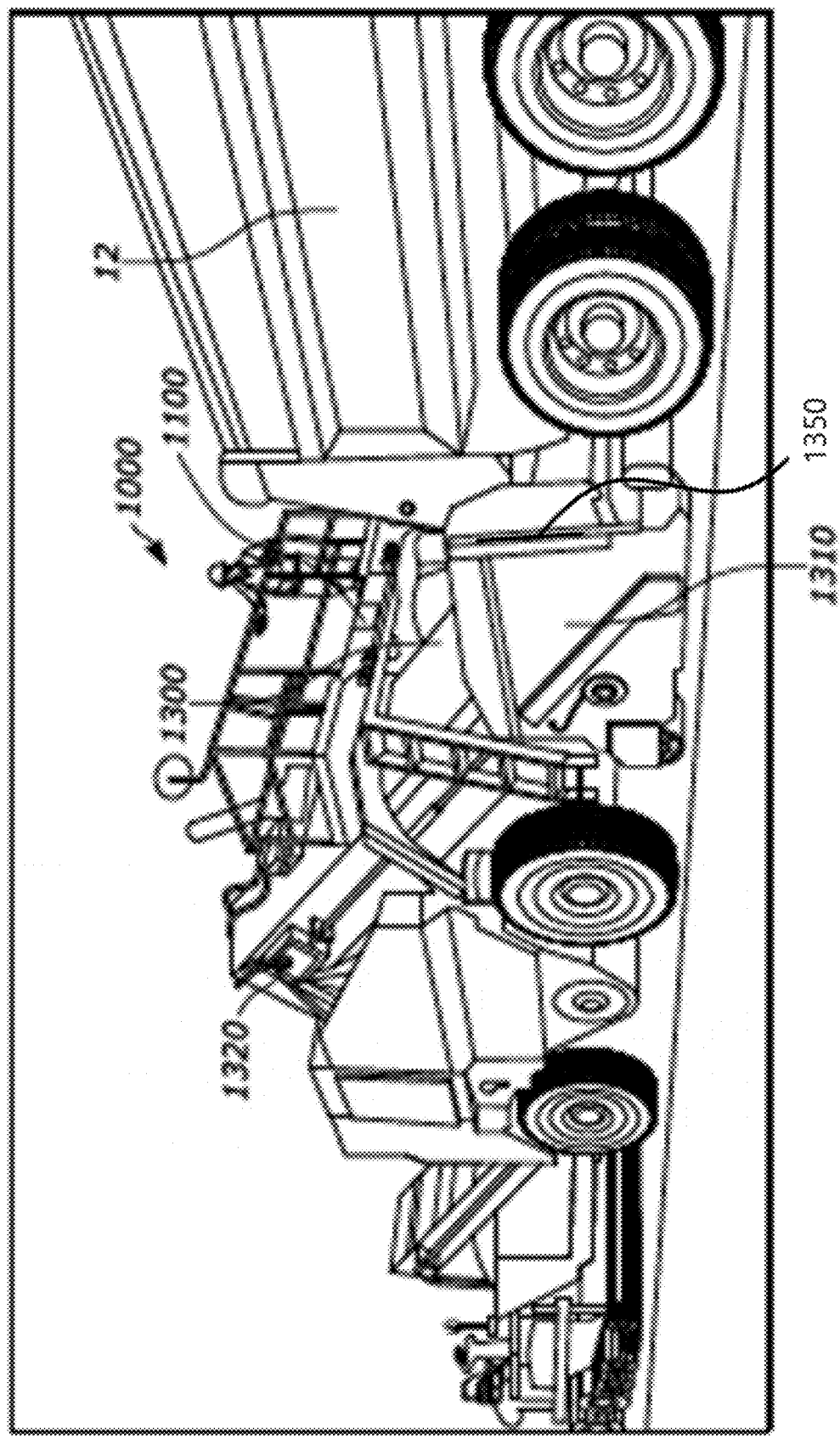
FIG. 9 is a view of a system in accordance with an example embodiment.

The above disclosure is not meant to limit the inventive concepts. For example, FIG. 9 illustrates an example of a material transfer vehicle (MTV) 1000 having a sensor 1100 that senses a dump truck 12 near a loading hopper 1310 (which may be the same as loading hopper 18) of a first feeder 1300. For example, the sensor 1100 may sense when a dump truck 12 is positioned to dump material into the loading hopper 1310. In one nonlimiting example embodiment, the sensor 1100 is mounted on a side of the MTV 1000 that faces a dump truck 12, for example the front or forward facing side of the MTV 1000, when the dump truck 12 is positioned to dump material into the loading hopper 1310. The example MTV 1000 may be somewhat similar to the earlier described MTV 14 and thus may be part of the earlier described train 100. In the example of FIG. 9, the sensor 1100 may sense whether or not a dump truck 12 is in a position and ready to unload into a hopper 1310 of the MTV 1000 and may also sense when the truck 12 has moved away from the MTV 1000. By way of example only, the sensor 1100 may be one or more of a radar, ultrasonic, laser, optical, pressure transducer (on a push roller), a speed sensor (on a push roller), proximity sensor, or a GPS based sensor.

In example embodiments, the sensor 1100 may send a signal to an electronic control module (ECM) 1200 of the MTV 1000 which may use this information to control various elements of the MTV 1000. For example, the ECM 1200 may control a first feeder 1300 of the MTV 1000 by controlling the first feeder's drive motor 1320 that controls a material transfer element 1330 of the first feeder 1300. In one embodiment, the drive motor 1320 may be a hydraulic motor driven by a hydraulic pump configured to control a speed of the material transfer element 1330. In another example, the drive motor 1320 may be an electric motor that actuates the material transfer element 1330. In either embodiment, the material transfer element 1330 may be any element that transfers asphalt from one end of the feeder 1300, for example, the end having the loading hopper 1310, to another end of the feeder 1300. For example, the material transfer element 1330 may be a chain with drag slats, a belt, or an auger designed to move asphalt.

Figure 10:
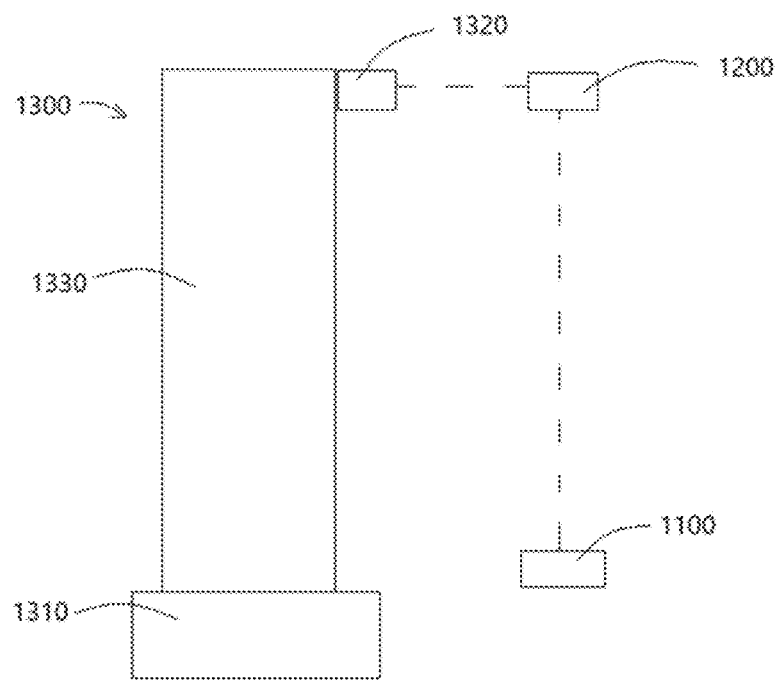
FIG. 10 is a view of a feeder control system in accordance with an example embodiment.
Figure 11:
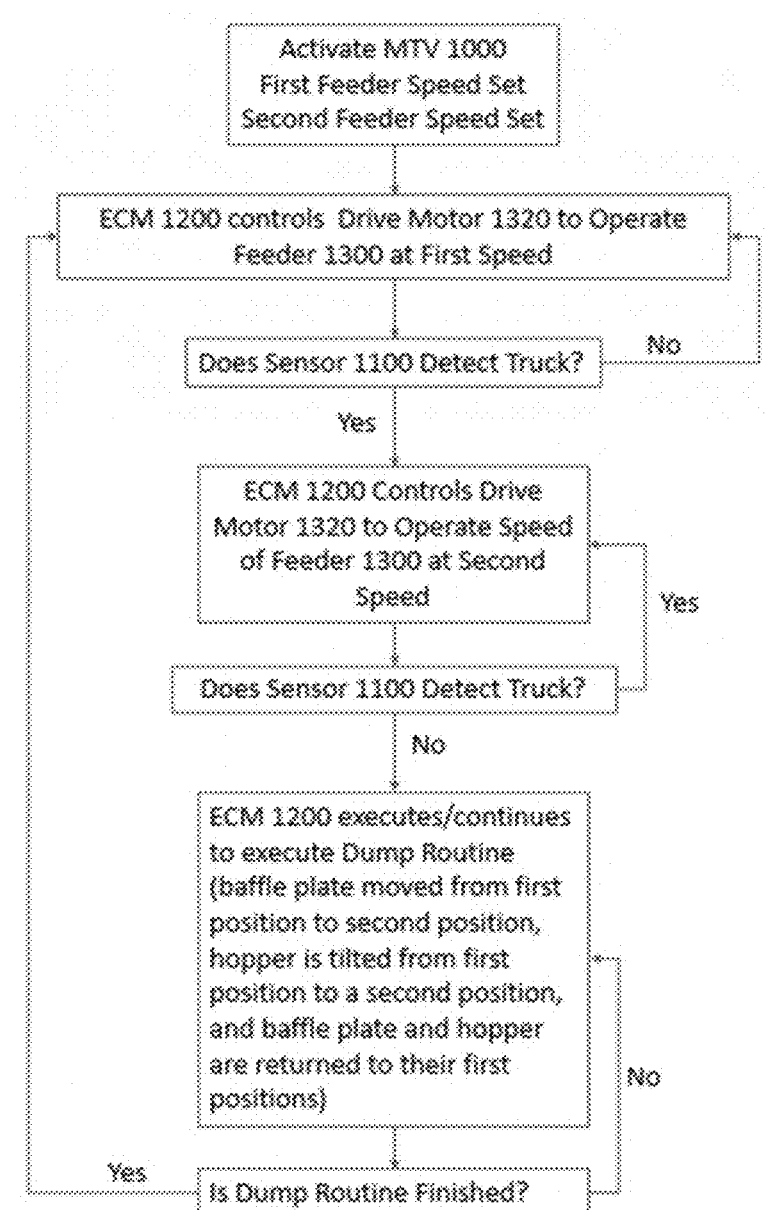
FIG. 11 is a view of a method in accordance with an example embodiment.

In the nonlimiting example of FIGS. 9 and 10, the loading hopper 1310 of the first feeder 1300 may resemble the previously described hopper illustrated in FIGS. 5, 6, and 7 and the ECM 1200 may control the loading hopper 1310 to execute operations and unloading routines similar to the previously described operations. For example, the ECM 1200 may cause the hopper 1310 to execute the previously described dumping and tilting routines after an absence of a truck 12 is detected by the sensor 1100. For example, when the truck 12 is detected as moving away, the ECM 1200 may cause the baffle 202*a* to move from a first to a second position and cause the loading hopper 1310 to tilt from a first position to a second position and thereafter move the baffle 202*a* and hopper 1310 back to their first positions after the asphalt is removed from the loading hopper 1310.

In the prior art, MTV operators generally run a feeder at a constant speed and keep the feeder running at the constant speed to ensure material is properly removed from the MTV's hopper. The feeder is often run at the constant speed regardless as to whether there is material in the hopper or whether a truck is scheduled to provide a load to the hopper. Additionally, an operator must generally execute a plurality of tasks such as controlling a propel speed of the machine, steering position of the machine, controlling a position of the feeder system that transfers material to a paver, monitoring the speed of multiple feeder systems, and monitoring material levels. Running a feeder at a constant speed enables the operator to focus on other duties. This aspect of the prior art ensures material in a hopper is removed, however it also causes unnecessary wear and tear on the feeder components and additionally requires unneeded power and/or fuel to keep the feeder moving even when it is not transferring material. In order to address these problems, the inventors modified the ECM 1200 of the MTV 1000 to automatically control the material transfer element 1330 of the feeder 1300 based on whether there is a dump truck 12 in a position ready for, or actually, transferring material into the hopper 1310 of the MTV 1000. For example, in one nonlimiting embodiment, the ECM 1200 will control the drive motor 1320 so that the material transfer element 1330 runs at a relatively low to no speed until the truck 12 is detected by the sensor 1100 at which time the ECM 1200 may control the drive motor 1320 to increase the speed of the material transfer element 1330 to a predetermined speed. Thereafter, the ECM 1200 may control the drive motor 1320 to reduce the speed of the material transfer element 1330 after the ECM 1200 determines the material in the hopper 1310 has been completely removed. In another embodiment, the ECM 1200 automatically activates the feeder 1300 when the truck 12 is detected by the sensor 1100. In another embodiment ECM 1200 is configured to deactivate or slow the feeder 1300 when an absence of the truck 12 is detected.

By way of nonlimiting example only, the ECM 1200 may be programmable such that a user/operator/manufacturer may set a first feeder speed which is the intended feeder speed when the material transfer element 1330 is not moving material from the hopper 1310 to a storage hopper of the MTV 1000. The ECM 1200 may also be programmable such that a user/operator/manufacturer may set a second feeder speed, generally faster than the first feeder speed, which is the intended feeder speed when the material transfer element 1330 is moving material from the hopper 1310 to the storage hopper of the MTV 1000. The ECM 1200 may be further programmed so that if a truck 12 is sensed by the sensor 1100 the ECM 1200 automatically increases the speed of the material transfer element 1330 (an example of feeder speed) from the first speed to the second speed. With this programming in place, the hopper 1310 may receive material from the truck 12 and the ECM 1200 may control the feeder 1300 to operate at or near the second speed while the truck unloads into the hopper. Once the truck is finished unloading and pulls away from the machine, the ECM may automatically trigger the hopper dumping routine. After the hopper dumping routine is finished (or after a preset time after the dumping routine is finished) the ECM 1200 may reduce the speed of the material transfer element 1330 from the second speed back to the first speed. This process may be repeated when a new truck 12 is detected by the sensor 1100. In example embodiments, the sensor 1100 may transmit data to the ECM 1200 either over a wire or wirelessly. Similarly, control over the drive motor 1320 by the ECM 1200 may be over a wire or wirelessly. Furthermore, there may be intermittent circuits or elements between the sensor 1100 and the ECM 1200 and between the ECM 1200 and the drive motor 1320. Regardless, the ECM 1200 controls the drive motor 1320 either directly or indirectly based on data or signals from the sensor 1100.

As one skilled in the art would readily appreciate, the process described above departs from traditional practice of manually controlling feeder/drive motor speed and on/off control in that the speed of a feeder 1300 is reduced or deactivated when a truck is not detected by a sensor 1100 and increased or activated when a truck is detected. This creates an ease and efficiency of operation as well as saves fuel and wear and tear on a traditional MTV. Further, a second MTV operator who is normally present to view a hopper while it is being filled in order to execute a dump routine may no longer be needed since the combination of the sensing means and ECM can determine when a dump routine is to be executed.

The inventive concepts cover additional features as well. For example, in one nonlimiting example embodiment, the ECM 1200 may be configured to use the data from the sensor 1100 to store and/or count the number of trucks that have unloaded into the MTV 1000. This data may allow an owner/operator to track a daily or lifetime truck count. In addition, this information may also be used to estimate the amount of material MTV 1000 has handled over a period of time, for example, daily or lifetime. For example, it may be known that trucks carrying material to an MTV carry a certain weight of asphalt and an estimate may be calculated by multiplying the average weight of asphalt per truck by the number of trucks that have unloaded into the MTV. This data may be transmitted to a device either wirelessly or over a wire to an owner/operator and/or stored in a memory of the ECM 1200 or some other memory available to the owner/operator. Further, the data may be displayed on a console so an/owner and operator may understand how much material an MTV 1000 has handled and passed through the MTV. Such information may be important for productivity calculations as well as proper maintenance and servicing of an MTV 1000. For example, it may be desirable to service an MTV 1000 after a certain amount of asphalt has been handled by the MTV 1000.

In example embodiments, each truck may carry a certain amount of material. In the conventional art these weights are recorded on weigh tickets and provided to a manager who thereafter collects the tickets to determine how much material has been brought to a worksite. However, in the instant invention, because the ECM 1200 may record each time a load is delivered to a MTV 1000 and the ECM 1200 may transmit load information to the manager, weigh tickets may no longer be necessary. The instant invention, furthermore, is more accurate than traditional methods since weigh tickets may be lost and/or incorrectly added up. In another embodiment, the process may be improved by placing load information on a truck, for example, on an active or passive RFID chip, which thereafter transmits the load information to the ECM 1200, either directly or indirectly, upon unloading. Thus, the ECM 1200 may not only record whether a load was received, but how much tonnage was received as well.

The instant examples are not meant to limit the inventive concepts. For example, while sensor 1100 has been shown as being mounted on a front of the MTV 1000 that faces a truck 12, the invention is not limited thereto as the sensor 1100 may be mounted at another location. For example, the sensor 1100 may be mounted on a surface of the MTV 1000 that does not face the truck 12 but may still be positioned so that the sensor 1100 detects the truck 12 when it is at or very near a location to fill the hopper 1310 of the feeder 1300.

One of the inventive concepts disclosed herein is a material transfer vehicle 1000 comprising a feeder 1300 having a loading hopper 1310 configured receive asphalt from a truck. The feeder 1300 may further include a material transfer element 1330 configured to move asphalt from the loading hopper 1330. The material transfer element 1330 may be a chain or a belt or some other element, for example, an auger, capable of moving asphalt from one end of the feeder 1300 to another end of the feeder 1300. In one nonlimiting example embodiment, the feeder 1300 further includes a drive motor 1320 configured to control the material transfer element 1330. The drive motor 1320 may be a hydraulic motor controlled by a pump, an electric motor controlled by a generator/inverter or some other driver which may cause the material transfer element 1330 to move asphalt, for example, an electrically or hydraulically powered auger. In example embodiments the material transfer vehicle 1000 may further include a sensor 1100 configured to detect a presence of the truck 12 and an electronic control module (ECM) 1200. The electronic control module 1200 may be configured to operatively control the driver 1320 to automatically increase a speed at which the material transfer element 1330 operates when the sensor 1100 detects a presence of a truck 12.

Figure 4:
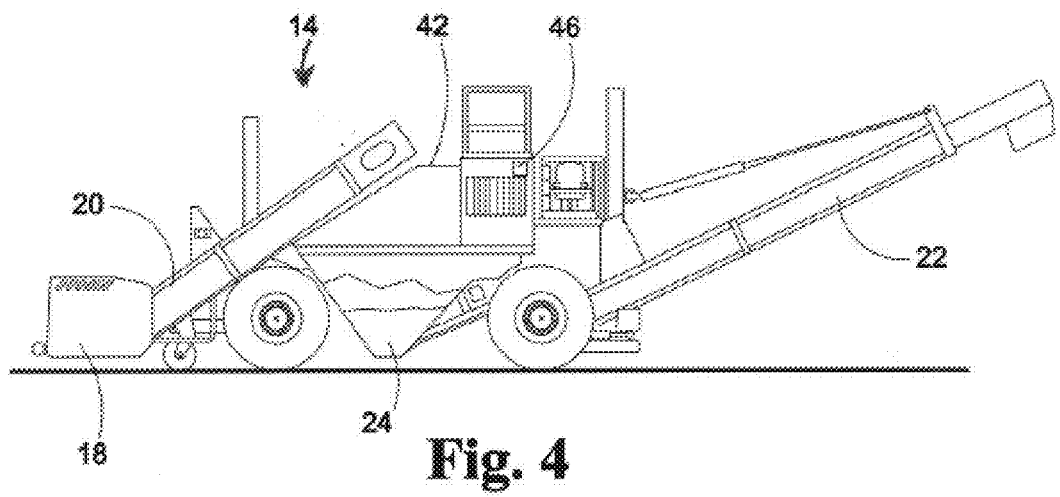
FIG. 4 is a more detailed representation of a MTV.
Figure 12:
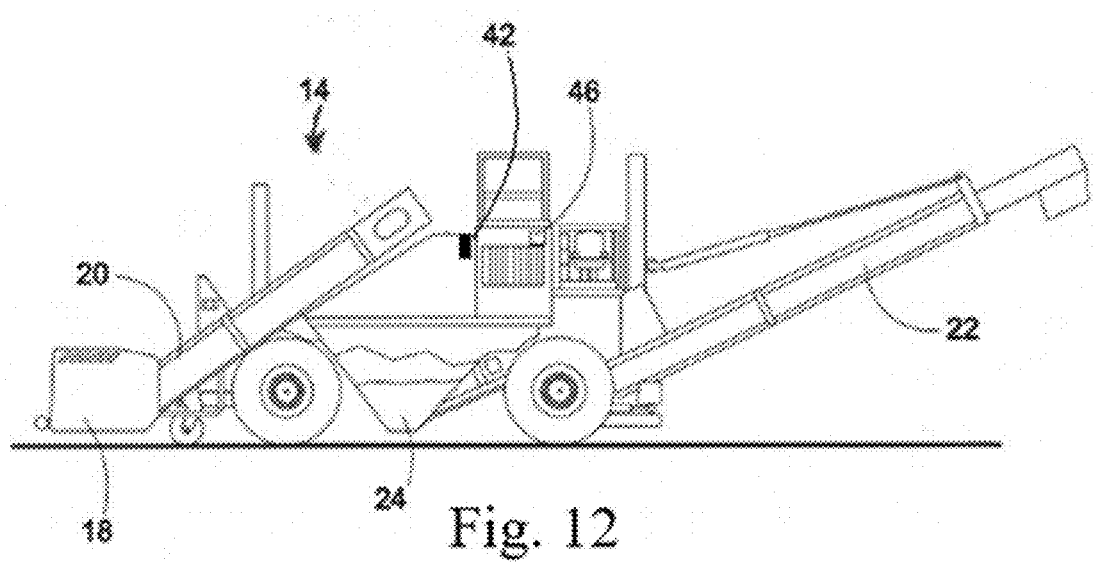
FIG. 12 is a detailed representation of a MTV.
Figure 13:
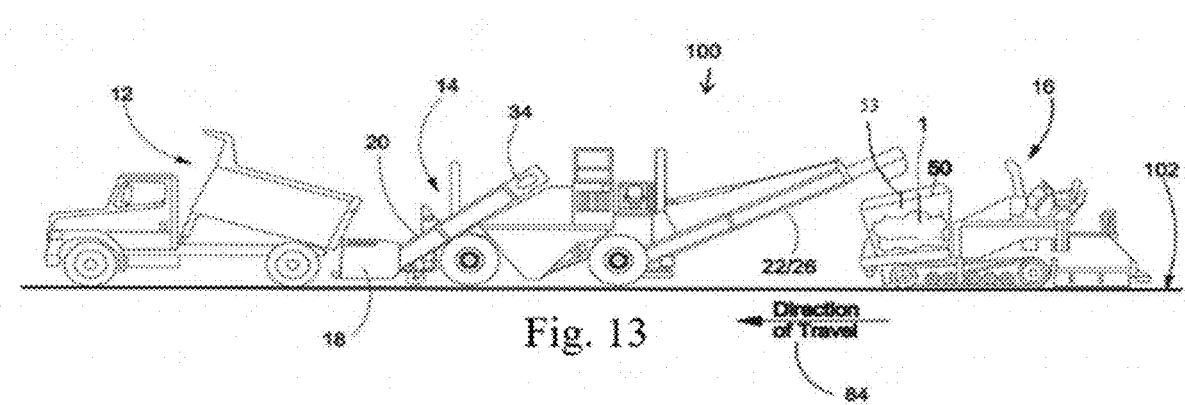
FIG. 13 is a diagram showing the arrangement of the system including a paver, MTV, and truck unloading, i.e., a paving train.

FIG. 12 is another example of a material transfer vehicle 14 in accordance with an example embodiment. In FIG. 12, the material transfer vehicle 14 is very similar to the previously described material transfer vehicle 14 of FIG. 4, however, the material transfer vehicle 14 of FIG. 12 includes a sensor 42, for example, an ultrasonic sensor, which may detect a level of material, for example, asphalt, in the storage hopper 24 of the material transfer vehicle 14. The sensor 42 may be further configured to send information related to a level of material to the controller 46 either wirelessly or over a wire. A similar sensor 53 (see FIG. 13) may be provided to detect a level of material in a storage hopper 50 of the paver 16. The sensor 53 may or may not be in the storage hopper 50, may detect a level of material in the hopper 50, and send information related to an amount of material in the hopper 50 to the controller 46.

By way of non-limiting example only, the controller 46 may be programmed by a user to control the material transfer vehicle 14 based on the input from the sensor 42 and/or sensor 53. For example, the controller 46 may be programmed so that if a height of material in the storage hopper 24 and/or 50 exceeds a preset height, the controller 46 may slow, alter, or stop operation of the material transfer vehicle 14 until the height of material drops below the preset level to avoid overfilling. For example, the controller 46 may slow or turn off or slow down the first feeder 20, the second feeder 22 or both the first and second feeders 20 and 22. Similarly, when the truck 12 pulls away from the material transfer vehicle 14 the unloading and tipping sequence of truck receiving hopper (1310 or 18) may be delayed until it is determined the storage hopper 24 and/or receiving hopper 50 can accept additional material. In the nonlimiting example of FIGS. 12 and 13, the sensors 42 and 53 may detect a height of material in the hoppers 24 and 50 and the controller 46 may use the heights to determine at what speed the feeders 20 and 22 of the material transfer vehicle 14 should operate.

In example embodiments, the sensors 1100 (which may be a lidar sensors) may be usable by the controllers 1200 and/or 46 for other purposes. For example, in one embodiment, the controllers 1200 and/or 46 may be configured to control a direction the material transfer vehicle 1000 and/or 14 is driven. In this nonlimiting example embodiment, the controllers 1200 and/or 46 may be configured to issue a "steering command" for controlling a steering direction of the material transfer vehicle 1000 and/or 14. In the prior art, for example, a width of the loading hopper 1310 and/or 18 is generally wider than the bed of the dump truck 12. However, to ensure the loading hopper 1310 and/or 18 is properly aligned with the bed of the dump truck 12, the sensor 1100 may send data indicative of a position of the bed of the dump truck 12 and the controller 1200 and/or 46 may thereafter use this information to issue a steering command to the material transfer vehicle's driving system to ensure a middle of the loading hopper 1310 and/or 18 is aligned with a middle of the bed of the dump truck 12. In another embodiment, the controller 1200 and/or 46 may issue a steering command to make sure the middle of the loading hopper 1310 and/or 18 is aligned with a middle of the bed of the dump truck 12 within a preset distance, for example, within one foot of each other. This latter feature allows for some flexibility in which the material transfer vehicle 1000 and/or 14 is controlled.

In yet another embodiment, information from the sensor 1100 may be usable for other purposes. For example, in one nonlimiting example embodiment, data from the sensor 1100 may be received by the controller 1200 and/or 46 which may control a plurality of lights 1350 which may be observable by a truck driver when backing a truck 12 up towards the material transfer vehicle 1000 and/or 14. For example, lights 1350 may be lights arranged on the sides of the loading hopper 1310 and/or 18. The controller 1200 and/or 46, for example, may be configured to control the plurality of lights 1350 to turn green when it is determined it is acceptable for the truck 12 to back up to the loading hopper 1310 and/or 18 of the material transfer vehicle 1000 and/or 14. For example, if the loading hopper 1310 and/or 18 is down and ready to receive a load of asphalt the controller 1200 and/or 46 may control the lights 1350 to turn green. On the other hand, if the loading hopper 1350 and/or 18 is full or not able to receive a load of asphalt, for example, because the first feeder 1300 and/or 20 is not operating or their hoppers are full, then the controller 1200 and/or 46 may control the plurality of lights 1350 to turn red. As yet another example, if the truck 12 is determined to be at a position to dump its load into the hopper 1310 and/or 18, the controller 1200 and/or 46 may control the lights 1350 to cycle one of upwards and downwards to indicate to the truck driver of the truck 12 that it can raise the truck bed 12 to dump its load into the loading hopper 1310.

Figure 14:
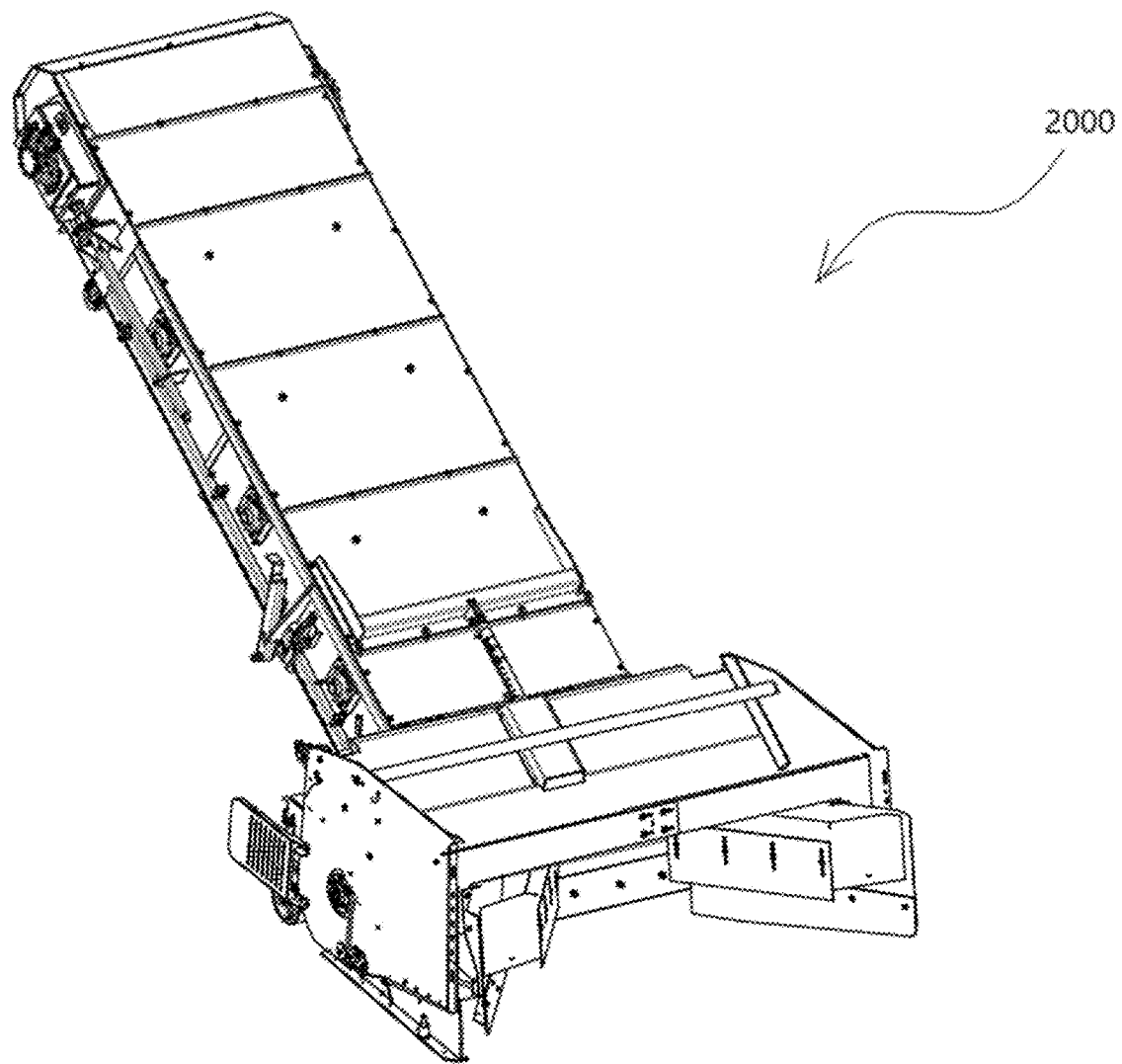
FIG. 14 is a view of a windrow head in accordance with an example embodiment.
Figure 15:
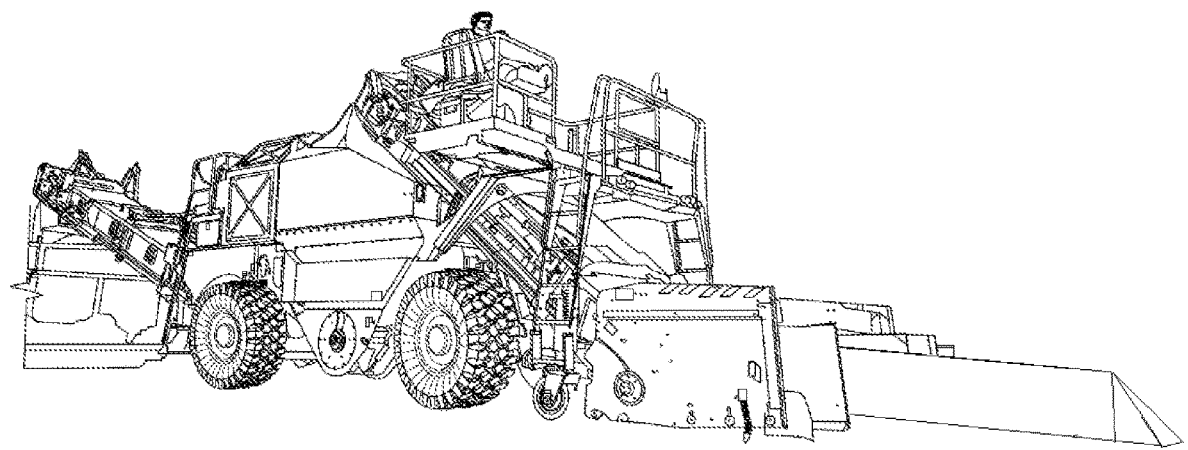
FIG. 15 is a view of an MTV using a windrow head in accordance with an example embodiment.

In example embodiments, the material transfer vehicle (MTV) 1000 and/or 14 is shown with a loading hopper 1310 and/or 18, but the inventive concepts are not limited thereto. For example, as shown in FIG. 14 material transfer vehicle (MTV) 1000 and/or 14 may utilize a windrow head 2000 rather than a loading hopper 1310 and/or 18. In this example, the sensor 1100 may detect a windrow of material, for example, asphalt, and the controller 1200 and/or 46 may use this information to issue steering commands to ensure material transfer vehicle 1000 and/or 14 moves so that the windrow head 2000 is properly centered on the windrow to pick up the windrow material. Additionally, the controller 1200 and/or 46 may utilize the sensor information to confirm a load of asphalt has been dumped from a truck to road surface, and or, the ground. The controller 1200 and/or 46 may store this information on a periodic basis for the lifetime of the material transfer vehicle (MTV) 1000 and/or 14 allowing a determination as to how much material the material transfer vehicle (MTV) 1000 and/or 14 has handled over the periodic basis or the lifetime of the material transfer vehicle (MTV) 1000 and/or 14. It is understood the material transfer vehicle (MTV) 1000 and/or 14 may utilize either a loading hopper or a windrow head and the material transfer vehicle (MTV) 1000 and/or 14 may count the number of trucks which have dumped material into the loading hopper, when the loading hopper is used, or on the ground, when the windrow head is used, allowing one to determine how much material the material transfer vehicle (MTV) 1000 and/or 14 has received on a periodic basis or the lifetime of the material transfer vehicle (MTV) 1000 and/or 14.

What we claim is:

1. A material transfer vehicle comprising:
   a sensor configured to detect at least one of an arrival of a thick and a departure of a truck;
   an electronic control module (ECM) configured to receive a signal from the sensor; and
   a feeder configured to receive asphalt from the truck, the feeder having a material transfer element configured to move asphalt, wherein the ECM is configured to control the feeder based on the received signal.

2. The material transfer vehicle of claim 1, wherein the ECM is configured to automatically execute an unloading routine when the sensor detects the departure of the truck, wherein the unloading routine causes a baffle to move from a first position to a second position, causes a loading hopper to tilt from a first position to a second position and thereafter move the baffle and loading hopper back to their first positions after the asphalt is removed from the loading hopper.

3. The material transfer vehicle of claim 1, wherein the ECM is configured to automatically increase a speed at which the material transfer element is operating when the sensor detects the arrival of the truck.

4. The material transfer vehicle of claim 1, wherein the electronic control module is configured to automatically reduce a speed at which the material transfer element is actuated when the sensor detects the departure of the truck.

5. The material transfer vehicle of claim 1, wherein the electronic control module automatically deactivates the material transfer element when the departure of the truck is detected.

6. The material transfer vehicle of claim 1, wherein the electronic control module automatically activates the material transfer element when the arrival of the truck is detected.

7. The material transfer vehicle of claim 1, where the material transfer element is actuated by one of an electric motor and a hydraulic motor.

8. The material transfer vehicle of claim 1, wherein the material transfer element is a chain.

9. The material transfer vehicle of claim 1, wherein the material transfer element is a belt.

10. The material transfer vehicle of claim 1, wherein the material transfer element is an auger.

* * * * *

UNITED STATES PATENT AND TRADEMARK OFFICE
CERTIFICATE OF CORRECTION

| | |
|---|---|
| PATENT NO. | : 11,731,840 B2 |
| APPLICATION NO. | : 17/366362 |
| DATED | : August 22, 2023 |
| INVENTOR(S) | : Weiler et al. |

It is certified that error appears in the above-identified patent and that said Letters Patent is hereby corrected as shown below:

In the Claims

Claim 1 should read as follows (Line 32; Column 20):
A material transfer vehicle comprising:
a sensor configured to detect at least one of an arrival of a truck and a departure of a truck;
an electronic control module (ECM) configured to receive a signal from the sensor; and
a feeder configured to receive asphalt from the truck, the feeder having a material transfer element configured to move asphalt, wherein the ECM is configured to control the feeder based on the received signal.

Signed and Sealed this
Fourteenth Day of November, 2023

Katherine Kelly Vidal
*Director of the United States Patent and Trademark Office*